US012661990B2

(12) United States Patent
Yamazaki et al.

(10) Patent No.: US 12,661,990 B2
(45) Date of Patent: Jun. 23, 2026

(54) DISPLAY CONTROL DEVICE AND DISPLAY CONTROL METHOD

(71) Applicant: JVCKENWOOD Corporation, Yokohama (JP)

(72) Inventors: Suzu Yamazaki, Yokohama (JP); Tomoko Kitamura, Yokohama (JP); Yoshitsugu Kojima, Yokohama (JP); Shin Nakate, Yokohama (JP); Yuka Aoki, Yokohama (JP); Hinano Kunizoe, Yokohama (JP); Masami Nakamura, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 22 days.

(21) Appl. No.: 19/023,532

(22) Filed: Jan. 16, 2025

(65) Prior Publication Data

US 2025/0153569 A1 May 15, 2025

Related U.S. Application Data

(63) Continuation of application No. PCT/JP2023/021908, filed on Jun. 13, 2023.

(30) Foreign Application Priority Data

Sep. 27, 2022 (JP) ................................. 2022-153283
Sep. 27, 2022 (JP) ................................. 2022-153337

(51) Int. Cl.
*B60K 35/81* (2024.01)
*B60K 35/10* (2024.01)
(Continued)

(52) U.S. Cl.
CPC .............. *B60K 35/81* (2024.01); *B60K 35/10* (2024.01); *B60K 35/22* (2024.01); *B60K 35/28* (2024.01);
(Continued)

(58) Field of Classification Search
CPC ........ B60K 35/81; B60K 35/10; B60K 35/22; B60K 35/28; B60K 35/29; G01C 21/36;
(Continued)

(56) References Cited

U.S. PATENT DOCUMENTS

2003/0126237 A1 7/2003 Tsuchiya
2005/0052413 A1* 3/2005 Ueno .................. G01C 21/3673
345/158

(Continued)

FOREIGN PATENT DOCUMENTS

JP 5-303334 11/1993
JP 2003-167585 6/2003
(Continued)

OTHER PUBLICATIONS

International Search Report and Written Opinion for International Application Serial No. PCT/JP2023/021908 mailed Aug. 1, 2023, 10 pages.

*Primary Examiner* — Tan Q Nguyen
(74) *Attorney, Agent, or Firm* — Amin, Turocy & Watson, LLP

(57) ABSTRACT

A control device serving as a display control device includes a positional information acquisition unit, a determination unit that, based on positional information and speed information, determines whether a time required to travel from the current position of a vehicle to a guide point where the next leading guide is made on a route to a destination that the vehicle travels is equal to or more than a threshold time or whether the current position of the vehicle is within an area of a given distance from the guide point where the next leading guide is made; a display controller that changes a display mode of a display screen based on a result of the determining; and a line-of-sight operation receiver that receives an operation performed using a line of sight of a person on board on the display screen, wherein the display (Continued)

mode includes a first mode in which music information on music that is being reproduced in the vehicle is displayed and a second mode that is different from the first mode and in which information other than the music information is displayed, and the line-of-sight operation receiver receives a saving information on the music that is being reproduced of saving information on the music that is being reproduced using a line of sight in the first mode and causes a storage unit to store the saving operation.

7 Claims, 7 Drawing Sheets

(51) Int. Cl.
*B60K 35/22* (2024.01)
*B60K 35/28* (2024.01)
*B60K 35/29* (2024.01)
*G01C 21/36* (2006.01)

(52) U.S. Cl.
CPC ........ *B60K 35/29* (2024.01); *B60K 2360/149* (2024.01); *B60K 2360/186* (2024.01); *B60K 2360/595* (2024.01)

(58) Field of Classification Search
CPC .... G06F 3/01; G06F 3/51; G09G 5/36; G09G 5/02
See application file for complete search history.

(56) References Cited

U.S. PATENT DOCUMENTS

| | | | | |
|---|---|---|---|---|
| 2016/0089980 | A1* | 3/2016 | Kurahashi | B60K 35/60 |
| | | | | 345/156 |
| 2017/0350718 | A1 | 12/2017 | Schulz | |
| 2018/0081614 | A1* | 3/2018 | Tsai | G01C 21/3688 |

FOREIGN PATENT DOCUMENTS

| | | |
|---|---|---|
| JP | 2008-45892 | 2/2008 |
| JP | 2012-98307 | 5/2012 |
| JP | 2017-223666 | 12/2017 |
| JP | 2018-112486 | 7/2018 |

* cited by examiner

15

MUSIC NAME

ALBUM NAME

ARTIST NAME

15

DISPLAY CONTROL DEVICE AND DISPLAY CONTROL METHOD

CROSS-REFERENCE TO RELATED APPLICATIONS

This application is a Continuation of PCT International Application No. PCT/JP2023/021908 filed on Jun. 13, 2023 which claims the benefit of priority from Japanese Patent Application No. 2022-153283 filed on Sep. 27, 2022, and Japanese Patent Application No. 2022-153337 filed on Sep. 27, 2022, the entire contents of all of which are incorporated herein by reference.

BACKGROUND OF THE INVENTION

1. Field of the Invention

The present disclosure relates to a display control device and a display control method.

2. Description of the Related Art

A technology of presenting information on a point around a vehicle in which a person on the vehicle has an interest (POI) to the person on board has been known (for example, refer to Japanese Laid-open Patent Publication No. 2017-223666). According to Japanese Laid-open Patent Publication No. 2017-223666, a POI in which a person on board has an interest is specified using a direction of interest of a person on board obtained by a gesture recognition device that is an eye-tracker and positional information based on a GPS.

For example, when favorite music is reproduced in a vehicle, the driver of the vehicle is unable to operate a portable electronic device and thus has to remember the feature of the music and conducts a search later. The driver however sometimes forgets to search for the music because the driver concentrates on driving or the time elapses.

A technology for receiving an operation performed using a line of sight during driving of a vehicle like the technology described in Japanese Laid-open Patent Publication No. 2017-223666 has been known. Particularly at the timing where attentions have to be paid to driving, receiving an operation performed using a line of sight is sometimes not appropriate. It is thus required to save information on music being reproduced in a vehicle at appropriate timing while the vehicle is traveling.

The present disclosure provides a display control device and a display control method that make it possible to save information on music that is being reproduced in a vehicle at appropriate timing while the vehicle is traveling.

SUMMARY OF THE INVENTION

It is an object of the present invention to at least partially solve the problems in the conventional technology.

The above and other objects, features, advantages and technical and industrial significance of this invention will be better understood by reading the following detailed description of presently preferred embodiments of the invention, when considered in connection with the accompanying drawings.

A display control device apparatus according to the present disclosure comprising:

a positional information acquisition unit that acquires positional information representing a current position of a vehicle;

a speed information acquisition unit that acquires speed information representing a speed of the vehicle; a calculator that, based on the positional information that is acquired by the positional information acquisition unit and the speed information that is acquired by the speed information acquisition unit, calculates a time required to travel from the current position of the vehicle to a guide point where the next leading guide is made on a route to a destination that the vehicle travels;

a determination unit that determines whether the required time that is calculated by the calculator is equal to or more than a threshold time;

a display controller that changes a display mode of a display screen based on a result of the determining by the determination unit; and a line-of-sight operation receiver that receives an operation performed using a line of sight of a person on board on the display screen, wherein the display mode includes a first mode in which music information on music that is being reproduced in the vehicle is displayed and a second mode that is different from the first mode and in which information other than the music information is displayed, the line-of-sight operation receiver receives a saving operation of saving information on the music that is being reproduced using a line of sight in the first mode and causes a storage unit to store the saving information on the music that is being reproduced, and the display controller makes a switch from the second mode to the first mode after the guide point is passed, and the line-of-sight operation receiver saves the music being reproduced with a high priority when the line-of-sight operation receiver receives the saving operation within a threshold operation time after the switch from the second mode to the first mode is made.

A display control device apparatus according to the present disclosure comprising:

a positional information acquisition unit that acquires positional information representing a current position of a vehicle;

a route guide unit that acquires information on a guide point where the next leading guide is made from the current position of the vehicle on a route to a destination that the vehicle travels;

a determination unit that determines whether the current position of the vehicle is within an area of a given distance from the guide point;

a display controller that changes a display mode of a display screen based on a result of the determining by the determination unit; and a line-of-sight receiver that receives an operation performed using a line of sight of a person on the display screen, wherein the display mode includes a first mode in which music information on music that is being reproduced in the vehicle is displayed and a second mode that is different from the first mode and in which information other than the music information is displayed, the line-of-sight operation receiver receives a saving operation of saving information on the music being reproduced using a line of sight in the first mode and causes a storage unit to store the saving information on the music that is being reproduced, and

the display controller makes a switch from the second mode to the first mode after the guide point is passed, and the line-of-sight operation receiver saves the music being reproduced with a high priority when the line-of-sight operation receiver receives the saving operation within a threshold operation time after the switch from the second mode to the first mode is made.

A display control method executed by a computer that operates as a display control device, the method apparatus according to the present disclosure comprising:

acquiring positional information representing a current position of a vehicle;

acquiring speed information representing a speed of the vehicle;

based on the positional information that is acquired by the acquiring the positional information and the speed information that is acquired by the acquiring the speed information, calculating a time required to travel from the current position of the vehicle to a guide point where the next leading guide is made on a route to a destination that the vehicle travels;

determining whether the required time that is calculated by the calculating is equal to or more than a threshold time;

changing a display mode of a display screen based on a result of the determining; and receiving an operation performed using a line of sight of a person on board on the display screen, wherein the display mode includes a first mode in which music information on music that is being reproduced in the vehicle is displayed and a second mode that is different from the first mode and in which information other than the music information is displayed, the receiving includes receiving a saving operation of saving information on the music that is being reproduced using a line of sight in the first mode and causing a storage unit to store the saving information on the music that is being reproduced, and the changing makes a switch from the second mode to the first mode after the guide point is passed, and the receiving saves the music being reproduced with a high priority when the line-of-sight operation receiver receives the saving operation within a threshold operation time after the switch from the second mode to the first mode is made.

A display control method executed by a computer that operates as a display control device, the method apparatus according to the present disclosure comprising:

acquiring positional information representing a current position of a vehicle;

acquiring information on a guide point where the next leading guide is made from the current position of the vehicle on a route to a destination that the vehicle travels;

determining whether the current position of the vehicle is within an area of a given distance from the guide point;

changing a display mode of a display screen based on a result of the determining; and receiving an operation performed using a line of sight of a person on the display screen, wherein the display mode includes a first mode in which music information on music that is being reproduced in the vehicle is displayed and a second mode that is different from the first mode and in which information other than the music information is displayed, the receiving includes receiving a saving operation of saving information on the music being reproduced using a line of sight in the first mode and causing a storage unit to store the saving information on the music that is being reproduced, and the changing makes a switch from the second mode to the first mode after the guide point is passed, and the receiving saves the music being reproduced with a high priority when the line-of-sight operation receiver receives the saving operation within a threshold operation time after the switch from the second mode to the first mode is made.

DETAILED DESCRIPTION OF THE PREFERRED EMBODIMENTS

Embodiments of a display control device and a display control method according to the present disclosure will be described in detail below with reference to the accompanying drawings. Note that the following embodiments do not limit the present invention. In the embodiments, a display device 1 will be described as a device that is mounted on a vehicle. In the embodiments, the display device 1 incorporates functions of a navigation system and a car audio system.

First Embodiment

Display Device

Figure 1:
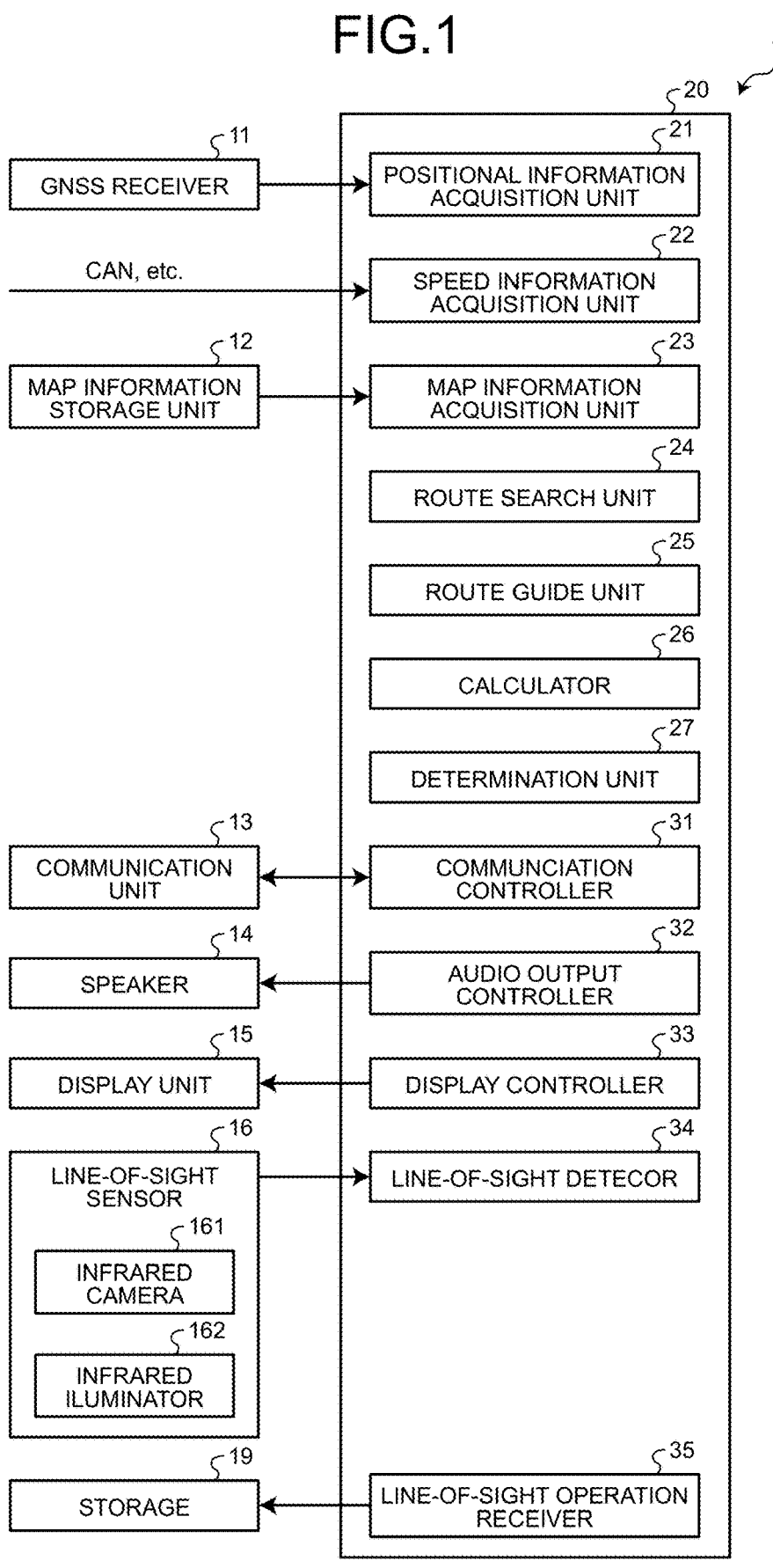
FIG. 1 is a block diagram illustrating an example of a configuration of a display device according to a first embodiment of the disclosure.

FIG. 1 is a block diagram illustrating an example of a configuration of the display device 1 according to the first embodiment of the disclosure. When music is being reproduced in a vehicle, the display device 1 makes a display while switching between a first mode in which information on the music that is being reproduced is displayed and a second mode in which a map is displayed and a route guide is made according to a time required to travel to the next route guide point. When the first mode is displayed, the display device 1 receives a saving operation of saving the information on the music being reproduced, which is an operation performed using a line of sight. The display device 1 includes a GNSS (Global Navigation Satellite System) receiver 11, a map information storage unit 12, a communication unit 13, a speaker 14, a display unit 15, a line-of-sight sensor 16, a storage 19, and a display control device ("control device" below) 20. The communication unit 13 is not an essential component.

The music is, for example, music content. The music is, for example, music that is reproduced by streaming services, radio broadcasting, or the like. The music is, for example, music that is stored in a memory card, or the like.

The GNSS receiver 11 consists of a GNSS receiving device that receives GNSS signals from GNSS satellites, etc. The GNSS receiver 11 outputs the received GNSS signals to a positional information acquisition unit 21.

The map information storage unit 12 stores map information containing information on roads. The map information storage unit 12 stores route information with which a route guide of a route from the current position of the vehicle to a destination is made. The map information storage unit 12 is shared with another system that is mounted on the vehicle in an example.

The communication unit 13 communicates information with external devices in a wired or wireless manner. The communication unit 13, for example, transmits or receives music data, or the like, to or from a portable electronic device of the person on the vehicle or a server device of a music streaming service business operator. The communication unit 13 may perform communication by any method, such as the Internet, a portable phone line, or car-to-car communication.

The speaker 14 is an audio output unit that outputs sound of the reproduced music. The speaker 14 outputs the music that is reproduced by the display device 1. The speaker 14 is an audio output device that is shared with another device that is mounted on the vehicle in an example. The speaker 14 outputs the sound based on the audio signal that is output from an audio output controller 32.

The display unit 15 displays various videos or images. The display unit 15 is, for example, a display including a liquid crystal display or an organic EL (Electro Luminescence) display. In the first embodiment, the display unit 15 makes a display in the first mode or the second mode on a display screen while the music is being reproduced and a route guide is being made by the navigation system. The display unit 15 displays various videos or images based on video signals from a display controller 33. The display unit 15 switches the display mode of the display screen based on a video signal from the display controller 33.

The display mode contains the first mode in which music information on the music being reproduced in the vehicle is displayed and a second mode that is different from the first mode and in which information other than the music information is displayed. In the first embodiment, a map for the route guide is displayed in the second mode.

Figure 2:
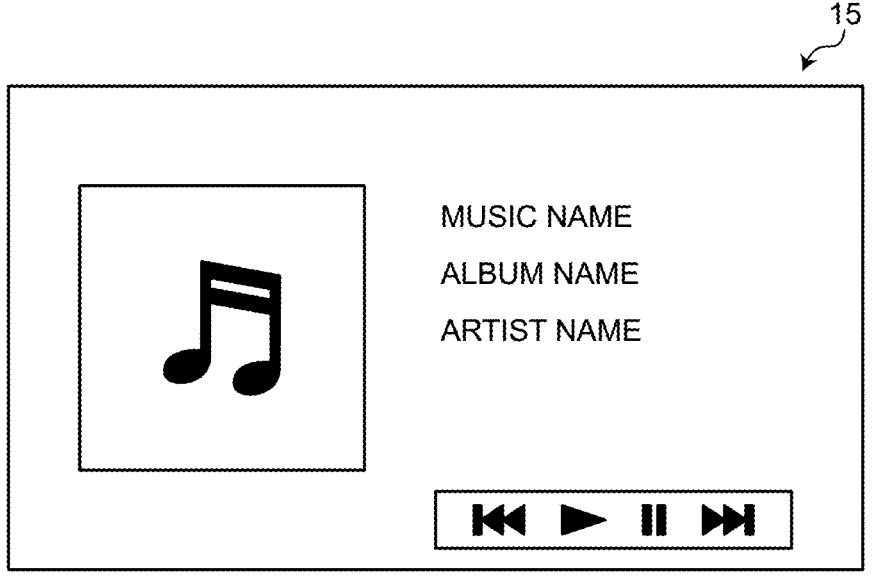
FIG. 2 is a diagram illustrating a first mode of a display screen.

FIG. 2 is a diagram illustrating the first mode of the display screen. As illustrated in FIG. 2, the information on the music being displayed is displayed on the display unit 15 in the first mode. The display unit 15, for example, displays the information on the music being reproduced. The display unit 15, for example, displays a music name of the music, an album name, an artist name, and a jacket image.

Figure 3:
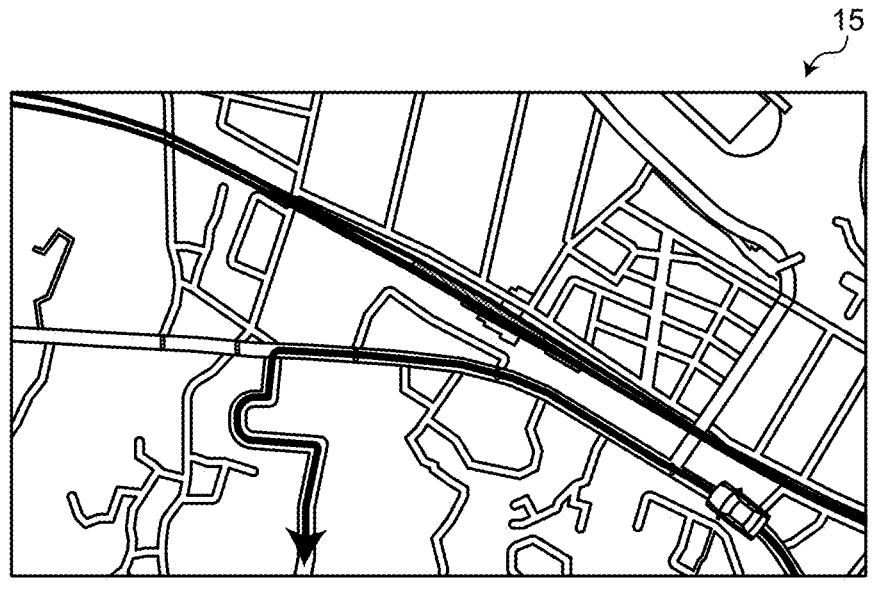
FIG. 3 is a diagram illustrating a second mode of the display screen.

FIG. 3 is a diagram illustrating the second mode of the display screen. As illustrated in FIG. 3, the display unit 15 displays a route guide image of the route from the current position of the vehicle to the destination in the second mode.

Figure 4:
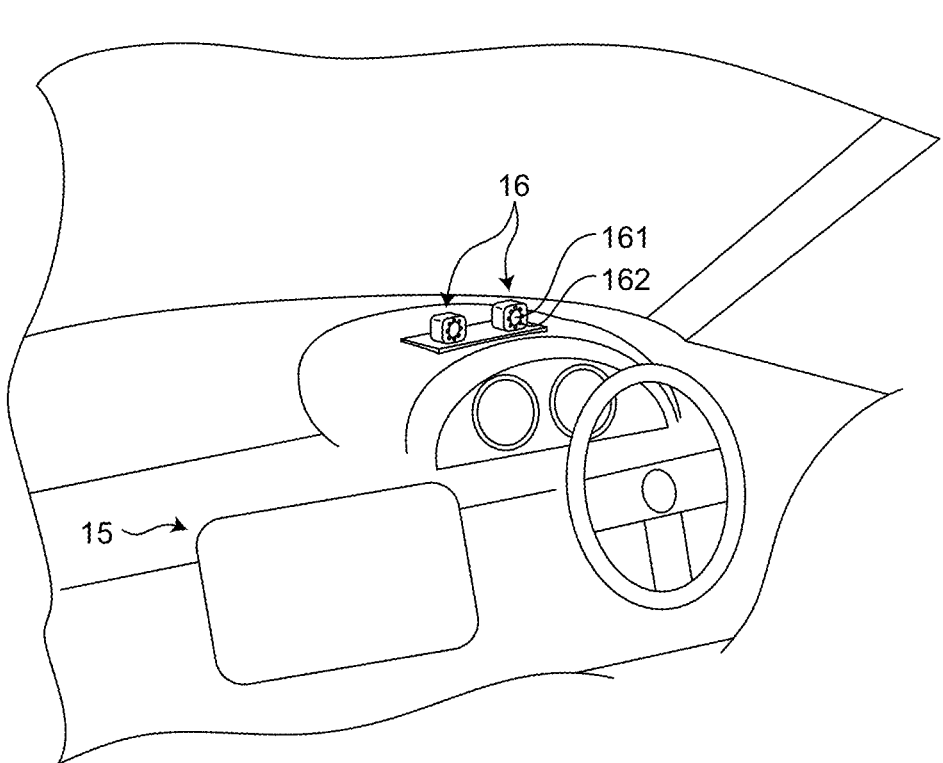
FIG. 4 is a schematic diagram illustrating a line-of-sight sensor that is mounted on a vehicle.

Using FIG. 4, the line-of-sight sensor 16 will be described. FIG. 4 is a schematic diagram illustrating a line-of-sight sensor that is mounted on the vehicle. The line-of-sight sensor 16 detects a line of sight of the person on board after an engine starts until the engine stops. The line-of-sight sensor 16 is arranged such that the line-of-sight sensor 16 is opposed to a driver's seat. The line-of-sight sensor 16, for example, includes infrared cameras 161 in a pair and an infrared illuminator 162 consisting of a group of infrared LEDs. In the first embodiment, the infrared illuminator 162 emits infrared light in a direction to the face of the person on board and an image is captured with the infrared cameras 161 in a pair. The line-of-sight sensor 16 detects a line of sight of the person on board based on the positions of the pupils of the person on board and corneal reflex from a video captured with the infrared cameras 161. The line-of-sight sensor 16 may have another configuration with a similar function. The line-of-sight sensor 16 outputs line-of-sight detection data as line-of-sight information to a line-of-sight detector 34 of the control device 20. Using the visible light camera, the line-of-sight sensor 16 may detect a line of sight based on the inner corners of the eyes and irises.

The storage 19 stores information on music on which saving operation is performed while the music is being reproduced. The storage 19 is, for example, a semiconductor memory device, such as a flash memory, or a recorder, such as a memory card. Alternatively, the storage 19 may be a portable electronic device of the person on the vehicle that is wirelessly connected via the communication unit 13. Furthermore, the storage 19 may be an extremal recorder that is connected wirelessly via the communication unit 13.

Control Device

The control device 20 is, for example, an arithmetic processing device consisting of a central processing unit (CPU), a video processing processor, etc. The control device 20 loads a program that is stored in a storage unit not illustrated in the drawing into a memory and executes instructions contained in the program. The control device 20 includes the positional information acquisition unit 21, a speed information acquisition unit 22, a map information acquisition unit 23, a route search unit 24, a route guide unit 25, a calculator 26, a determination unit 27, a communication controller 31, the audio output controller 32, the display controller 33, the line-of-sight detector 34, and a line-of-sight operation receiver 35. The control device 20 includes an internal memory not illustrated in the drawings and the internal memory is used to store data in the control device 20 temporarily. The control device 20 may consist of one or more devices. The communication controller 31 is not an essential component.

The positional information acquisition unit 21 acquires positional information representing the current position of the vehicle. The positional information acquisition unit 21, for example, acquires positional information based on the GNSS signals from the GNSS receiver 11.

The speed information acquisition unit 22 acquires speed information representing a speed of the vehicle via a controller area network (CAN).

The map information acquisition unit 23 acquires map information from the map information storage unit 12.

The route search unit 24 searches for a route from the current position of the vehicle to the destination. The route search unit 24 presents the searched route to the person on board. A know method is usable as a method of searching for a route and the method is not limited.

The route guide unit 25 performs a route guide from the current position of the vehicle. More specifically, the route guide unit 25 makes a route guide along the searched route. A known route guide method is usable as a method of making a route guide and the method is not limited.

Based on the positional information that is acquired by the positional information acquisition unit 21 and the speed information that is acquired by the speed information acquisition unit 22, the calculator 26 calculates a time required to travel from the current position of the vehicle to a guide point where the next leading guide is made on a route that the vehicle travels.

The leading guide is a guide on a course that is made during the route guide to the destination of the vehicle. The leading guide is, for example, a guide to turn left or right or a guide to change the lane.

The determination unit 27 determines whether the required time that is calculated by the calculator 26 is equal to or more than a threshold time.

The threshold time is a time particularly in which the person on board has to pay attentions to operations of driving the vehicle to the guide point. The threshold time is, for example, approximately 10 seconds.

Figure 5:
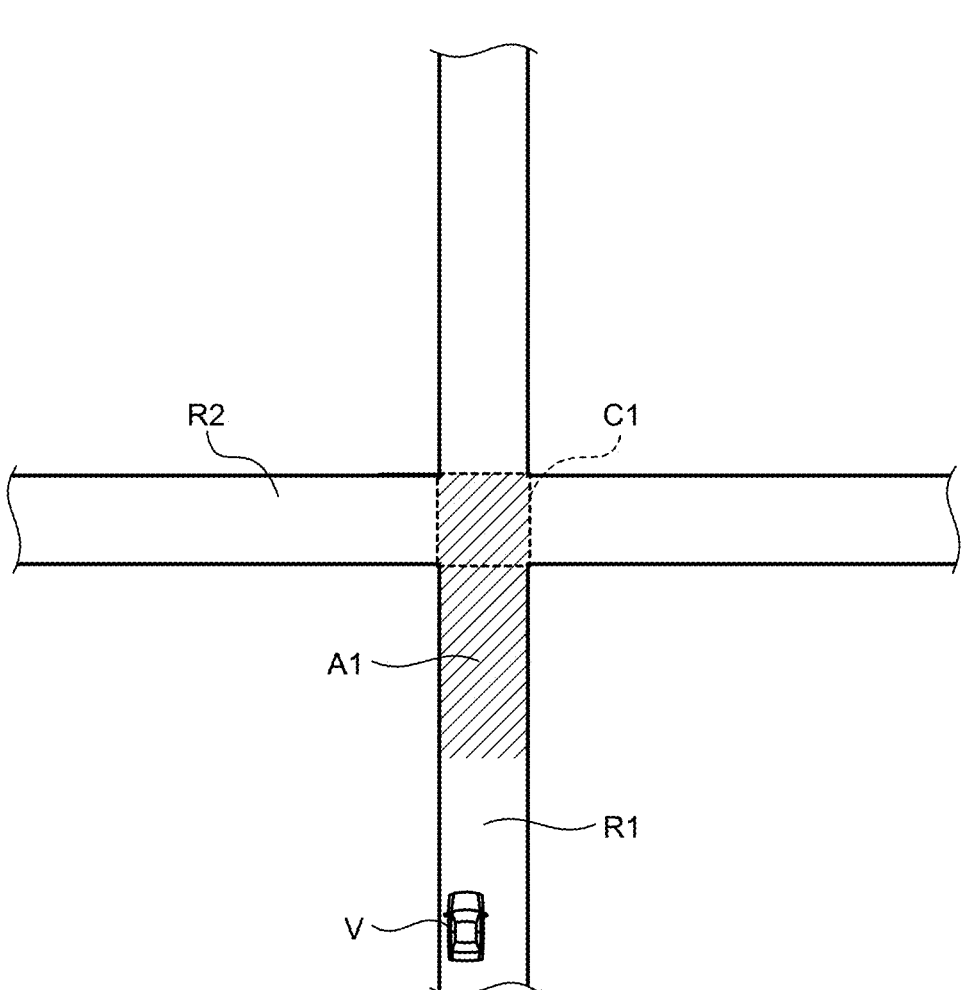
FIG. 5 is a diagram illustrating a guide point.

FIG. 5 is a diagram illustrating the guide point. In the example illustrated in FIG. 5, a vehicle V turns left at an intersection C1 and goes from a road R1 to a road R2. The intersection C1 is a guide point. An area A1 represented with slashed lines is an area about which the time required to travel to the intersection C1 is less than the threshold time. In the example illustrated in FIG. 5, the determination unit 27 determines that, when the vehicle V is in the area A1, the time required to travel to the intersection C1 is less than the threshold time.

The communication controller 31 controls communication in the communication unit 13. The communication controller 31 controls wired communication or wireless communication of music data, for example, with the portable electronic device of the person on the vehicle or the server device of the music streaming service business operator via the communication unit 13. In the first embodiment, the communication controller 31, for example, receives the music data from the portable electronic device of the person on the vehicle or the server device of the music streaming service business operator.

The audio output controller 32 performs control such that sound containing the music is output from the speaker 14. More specifically, the audio output controller 32, for example, performs control such that the music data that is acquired from the portable electronic device of the person on the vehicle is reproduced. The audio output controller 32, for example, performs control such that the music data that is acquired from the streaming service business operator is reproduced. The audio output controller 32, for example, performs control such that sound of radio broadcasting is reproduced. The audio output controller 32, for example, performs control such that the music that is stored in the memory card is reproduced.

The display controller 33 performs control to display a video, or the like, on the display screen of the display unit 15. The display controller 33 changes the display mode of the display screen based on the result of determination by the determination unit 27. The display controller 33 changes the display of the display screen to the first mode or the second mode based on the result of determination by the determination unit 27.

The display controller 33, for example, performs control to display the music name of the music being reproduced, the album name, the artist name, the jacket image, etc., in the first mode as illustrated in FIG. 2.

The first mode may be a mode in which a map image for a route guide of the navigation system like that illustrated in FIG. 3 and the information on the music that is being reproduced like that illustrated in FIG. 2 are displayed side by side.

The display controller 33 may perform control to display a map image containing roads based on the map information that is stored in the map information storage unit 12 in the second mode. The display controller 33, for example, performs control to display a map for a route guide of the navigation system in the second mode as illustrated in FIG. 3.

The second mode may be, when the display mode on the display unit 15 is set at a double-screen display mode, a mode in which only the map image for a route guide of the navigation system is displayed on the whole screen, that is, a mode in which a switch to a whole screen mode in which only the map image is displayed is made and a display is made.

In the first embodiment, when the determination unit 27 determines that the required time is equal to or more than the threshold time, the display controller 33 makes a display in the first mode on the display screen. In other words, when it is determined that the time required to travel to the next guide point is equal to or more than the threshold time, the display controller 33 makes a display in the first mode.

In the first embodiment, when the determination unit 27 determines that the required time is less than the threshold time, the display controller 33 makes a switch from the first mode to the second mode. In other words, when it is determined that the time required to travel to the next guide point is less than the threshold time, the display controller 33 makes a switch from the first mode to the second mode. In the example illustrated in FIG. 5, the display controller 33 switches the display screen from the first mode illustrated in FIG. 2 to the second mode illustrated in FIG. 3 while the vehicle is traveling in the area A1.

In the first embodiment, after the vehicle passes the guide point, the display controller 33 may make a switch from the second mode to the first mode. In the example illustrated in FIG. 5, after the vehicle passes the intersection C1, the display controller 33 switches the display screen from the second mode illustrated in FIG. 3 to the first mode illustrated in FIG. 2.

The line-of-sight detector 34 detects the line of sight of the person on board based on the line-of-sight detection data of the line-of-sight sensor 16 and acquires the line-of-sight information as a detection result. The line-of-sight detector 34 outputs the detection result to the line-of-sight operation receiver 35. In the first embodiment, the line-of-sight detector 34, for example, acquires, as the detection result, the fact that the line of sight turns to the display screen of the display unit 15 from the line of sight of the person on board or motions of the eyes.

The line-of-sight operation receiver 35 receives an operation performed using a line of sight of the person on board on the display screen of the display unit 15. More specifically, the line-of-sight operation receiver 35 receives an operation signal on the operation performed using the line of sight of the person on board that is receives via the line-of-sight detector 34. In the first embodiment, the line-of-sight operation receiver 35 acquires operation information representing a saving operation of saving the information on the music that is being reproduced based on the line-of-sight detection data of the line-of-sight sensor 16 and outputs a control signal for storing the information on the music being reproduced in the storage 19.

The line-of-sight operation receiver 35 is able to receive an operation of saving the information on the music being reproduced using a line of sight in the first mode of the display screen. More specifically, when the music information is displayed on the display screen, the line-of-sight operation receiver 35 is able to receive the saving operation of saving the information on the music being reproduced using a line of sight.

In the first embodiment, when the determination unit 27 determines that the required time is less than the threshold time, the display controller 33 is unable to receive an operation performed using a line of sight. In other words, when the display screen of the display unit 15 is displayed in the second mode, the line-of-sight operation receiver 35 is unable to receive an operation performed using a line of sight. When the determination unit 27 determines that the required time is equal to or more than the threshold time, the line-of-sight operation receiver 35 is able to receive an operation performed using a line of sight. In other words, when the display screen of the display unit 15 is displayed in the first mode, the line-of-sight operation receiver 35 is able to receive an operation performed using a line of sight in the first mode.

Reception of an operation performed using a line of sight is enabled only in the first mode because it is required to pay attentions to driving particularly when the time required to travel to the next guide point is less than the threshold time. For this reason, when the time required to travel to the next guide point is equal to or more than the threshold, that is, when the driver has leeway, reception of an operation performed using a line of sight is enabled.

In the first embodiment, when the saving operation is received within a threshold operation time, for example in 10 seconds, after a switch from the second mode to the first mode is made, the line-of-sight operation receiver 35 may save the music that is being reproduced with a high priority. For example, when the person on board performs the saving operation right after a switch from the second mode to the first mode is made, the line-of-sight operation receiver 35 may save the music being reproduced with a high priority. Prioritizing the music being reproduced will be described below.

In the first embodiment, for example, when it is detected that the line of sight of the person on board shifts from the outside of the display screen onto the display screen, the saving operation is performed. In the first embodiment, for example, when it is detected that the line of sight of the person on board remains in a given position on the display screen for a given time or more, the saving operation is performed. In the first embodiment, for example, when it is detected that the line of sight of the person on board is shifted from the lower side to the upper side on the display screen, the saving operation is performed.

The saving operation is an operation of saving the information on the music. Saving the information on the music is saving the music that is being reproduced such that it is possible to specify the music later. Saving the information on the music is, for example, registering the music in a playlist of the application that reproduces music.

The saved information on the music that is being reproduced is, for example, information representing the music name, the album name, the artist name, etc. The saved information on the music being reproduced may contain at least any one of information on a date at the time when the saving operation is received and information on a position of the vehicle at the time when the saving operation is received.

To prioritize music that is being reproduced, for example, the score of "the degree of favoring" each piece of music may be increased and then the information on the music being reproduced may be saved.

Process in Display Control Device

Figure 6:
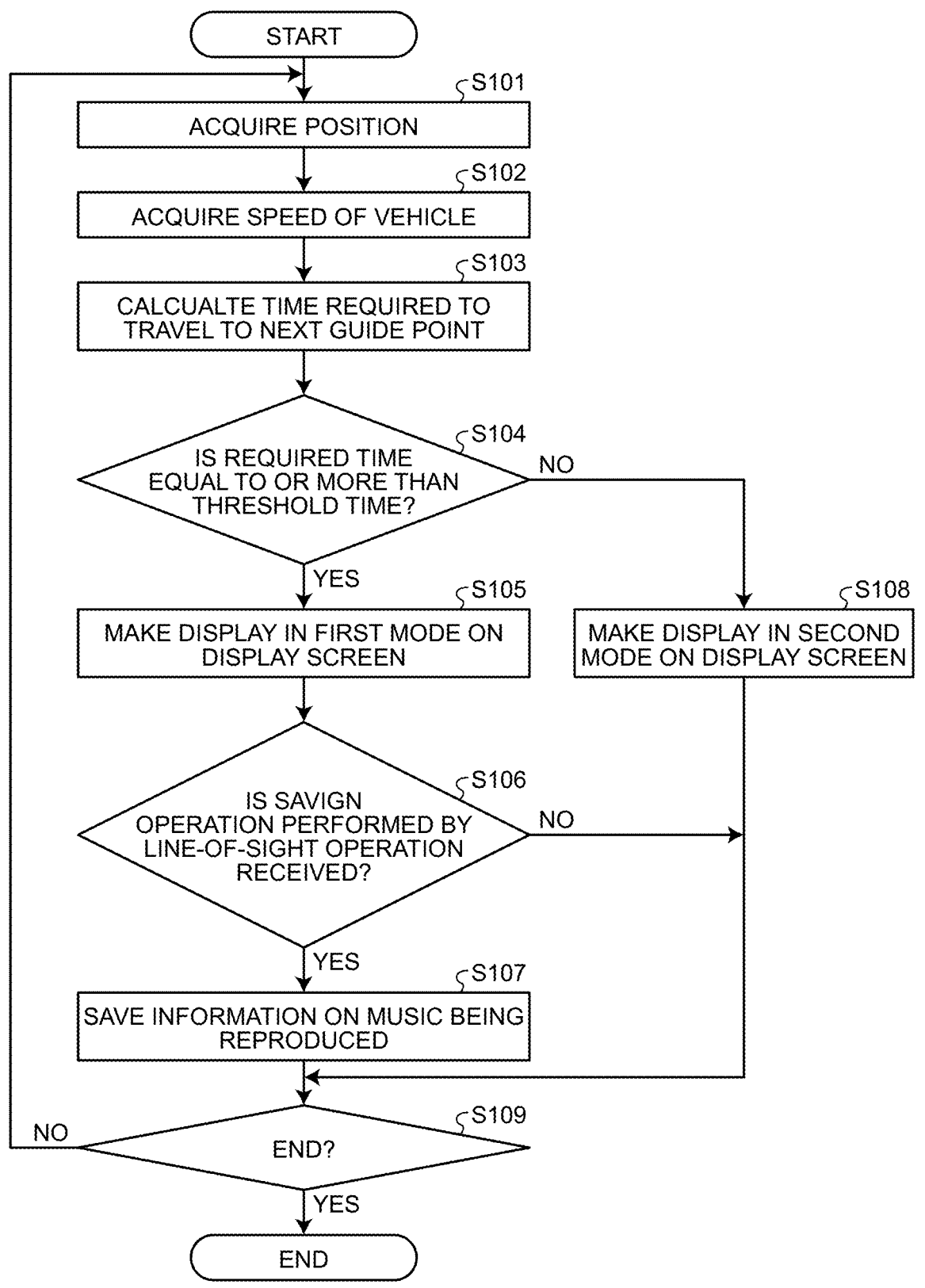
FIG. 6 is a flowchart illustrating an example of a flow of a process in a display control device according to a first embodiment of the disclosure.

Using FIG. 6, an example of a process in the control device 20 will be described. FIG. 6 is a flowchart illustrating the example of the flow of the process in the display control device according to the first embodiment of the disclosure. When music is reproduced and a route guide is made with the display device 1 being started, the process of the flowchart illustrated in FIG. 6 is executed.

The control device 20 acquires a position (step S101). More specifically, using the positional information acquisition unit 21, the control device 20 acquires positional information representing the current position of the vehicle. The control device 20 then moves to step S102.

The control device 20 acquires a speed of the vehicle (step S102). More specifically, using the speed information acquisition unit 22, the control device 20 acquires speed information representing the speed of the vehicle from the vehicle via the CAN. The control device 20 moves to step S103.

The control device 20 calculates a time required to travel to the next guide point (step S103). More specifically, using the calculator 26, the control device 20 calculates a time required to travel from the current position of the vehicle to a guide point where the next leading guide is made on a route that the vehicle travels based on the positional information that is acquired by the positional information acquisition unit 21 and the speed information that is acquired by the speed information acquisition unit 22. The control device 20 moves to step S104.

The control device 20 determines whether the required time is equal to or more than the threshold time (step S104). More specifically, using the determination unit 27, the control device 20 determines whether the required time that is calculated by the calculator 26 is equal to or more than the threshold time. When it is determined that the required time is equal to or more than the threshold time (YES at step S104), the control device 20 moves to step S105. When it is determined that the required time is less than the threshold time (NO at step S104), the control device 20 moves to step S108.

When it is determined that the required time is equal to or more than the threshold time (YES at step S104), the control device 20 makes a display in the first mode on the display screen (step S105). More specifically, using the display controller 33, the control device 20, for example, performs control to display the music name of the music that is being reproduced, the album name, the artist name, the jacket image, etc., in the first mode. The control device 20 moves to step S106.

The control device 20 determines whether the saving operation performed by a line-of-sight operation is received (step S106). More specifically, using the line-of-sight operation receiver 35, the control device 20 determines whether the saving operation of saving the information on the music being reproduced is received from the result of detection by the line-of-sight detector 34 based on the line-of-sight detection data of the line-of-sight sensor 16. When it is determined that the saving operation performed by the line-of-sight operation is received (YES at step S106), the control device 20 moves to step S107. When it is not determined that the saving operation performed by the line-of-sight operation is received (NO at step S106), the control device 20 moves to step S109.

When it is determined that the saving operation performed by the line-of-sight operation is received (YES at step S106), the control device 20 saves the information on the music being reproduced (step S107). According to a control signal presenting the saving operation received by the line-of-sight operation receiver 35, the control device 20 stores the information on the music being reproduced in the storage 19. The control device 20 moves to step S109.

When it is determined that the required time is less than the threshold time (NO at step S104), the control device 20 makes a display in the second mode on the display screen (step S108). More specifically, using the display controller 33, the control device 20 performs control to display a map for a route guide of the route from the current position of the vehicle to the destination in the second mode. The control device 20 moves to step S109.

The control device 20 determines whether to end the process (step S109). More specifically, the control device 20 determines to end the process when the display screen of the display device 1 is not displayed, reproduction of the music is ended, or when the route guide is ended. The control device 20 determines not to end the process when the display screen of the display device 1 is displayed, the music is being reproduced, and the route guide is being made. When it is determined to end the process (YES at step S109), the control device 20 ends the process. When it is not determined to end the process (NO at step S109), the control device 20 executes the process of step S101 again.

Effect

As described above, in the first embodiment, the display screen is changed to the first mode in which music information on music that is being reproduced is displayed or the second mode in which a route guide image is displayed based on a result of determining whether a time required to travel to a guide point is equal to or more than the threshold time. In the first embodiment, it is possible to receive an operation of saving the information on the music being reproduced using a lien of sight in the first mode. According to the first embodiment, it is possible to save the information on the music being reproduced in the vehicle at appropriate timing while the vehicle is traveling.

In the first embodiment, it is possible to enable the operation of saving the information on the music being reproduced while the required time to travel to the guide point is equal to or more than the threshold time and the first mode is being displayed. In the first embodiment, it is possible to disable the operation of saving the information on the music being reproduced when the required time to travel to the guide point is less than the threshold time and particularly it is necessary to pay attentions to operations of driving the vehicle. According to the first embodiment, it is possible to save the information on the music being reproduced in the vehicle at appropriate timing while the vehicle is traveling.

In the first embodiment, the information on the music being reproduced contains at least any one of information on a date at the time when the saving operation is received and information on a position of the vehicle at the time when the saving operation is received. According to the first embodiment, it is possible to save the date and the position at the time when the information on the music is saved together.

In the first embodiment, after the guide point is passed, the display screen is switched from the second mode to the first mode. In the first embodiment, when the operation of saving the information on the music that is being reproduced is received within the threshold operation time after the switch from the second mode to the first mode is made, it is possible to save the music being reproduced with a high priority. According to the first embodiment, for example, when the person on board performs the operation of saving the information on the music being reproduced right after the switch from the second mode to the first mode is made, it is possible to save the music being reproduced with a high priority.

Second Embodiment

Figure 7:
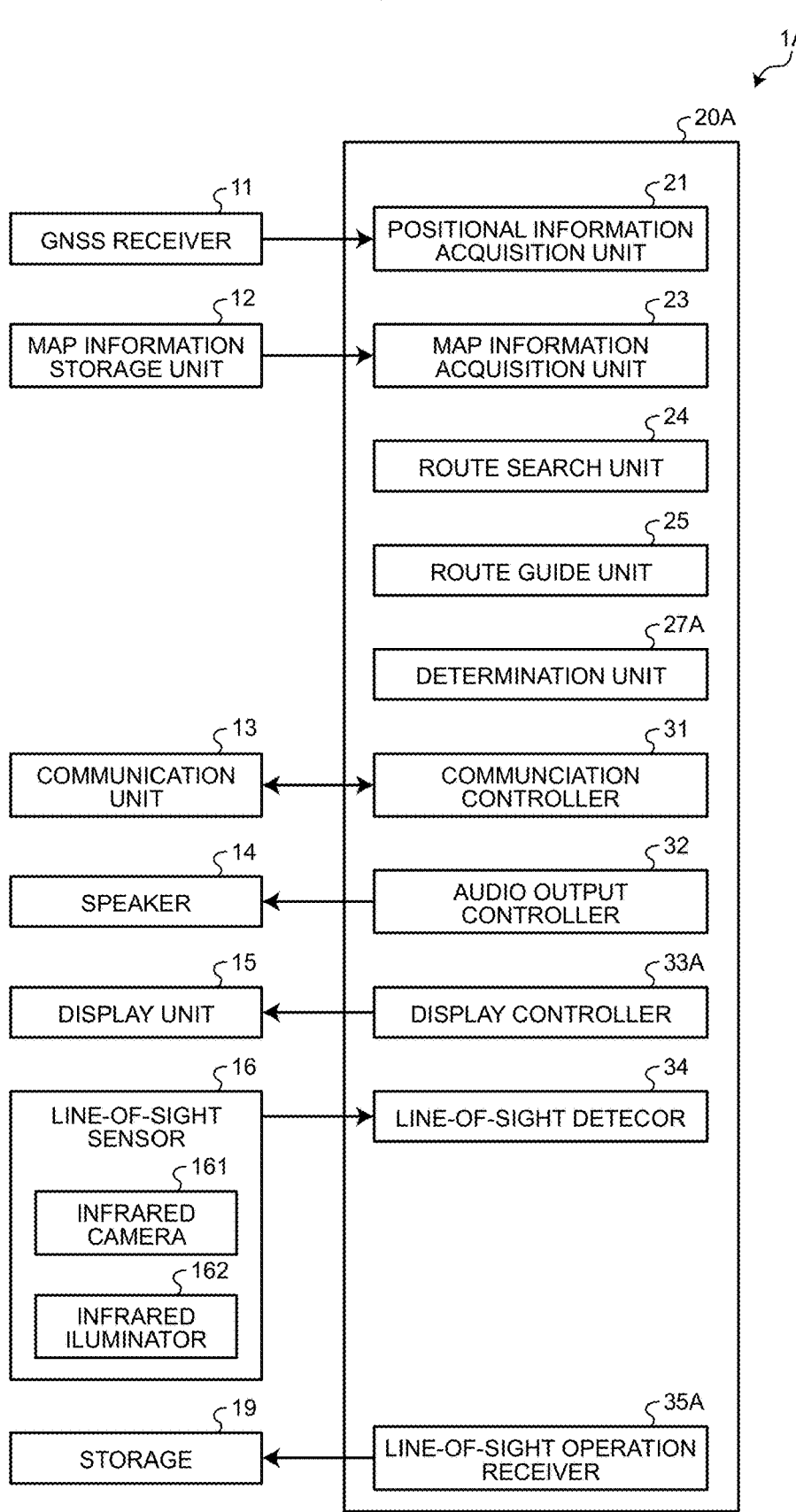
FIG. 7 is a block diagram illustrating an example of a configuration of a display device according to a second embodiment of the disclosure.
Figure 8:
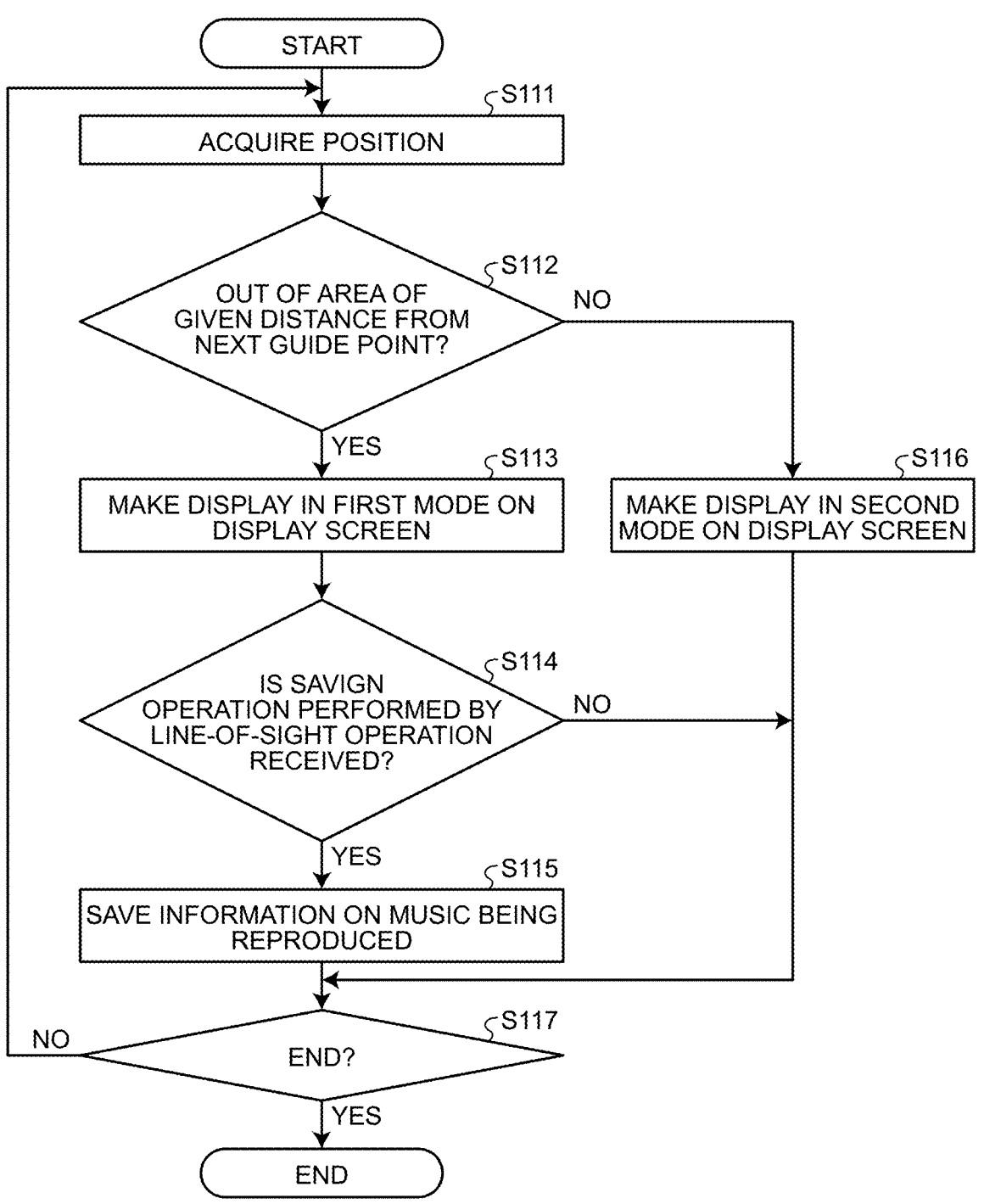
FIG. 8 is a flowchart illustrating an example of a flow of a process in a display control device according to the second embodiment of the disclosure.

With reference to FIGS. 7 and 8, a display device 1A according to a second embodiment will be described. FIG. 7 is a block diagram illustrating an example of a configuration of the display device according to the second embodiment of the disclosure. FIG. 8 is a flowchart illustrating an example of a flow of a process in a display control device according to the second embodiment of the disclosure. The basic configuration of the display device 1A is the same as that of the display device 1 of the first embodiment. In the following description, the same components as those of the display device 1 are denoted with the same reference numerals or corresponding reference numerals and detailed description thereof will be omitted. The display device 1A is different from the first embodiment in the configuration of a control device 20A.

The control device 20A includes the positional information acquisition unit 21, the map information acquisition unit 23, the route search unit 24, the route guide unit 25, a determination unit 27A, the communication controller 31, the audio output controller 32, a display controller 33A, the line-of-sight detector 34, and a line-of-sight operation receiver 35A.

The determination unit 27A determines whether the current position of the vehicle is within an area of a given distance from a guide point where the next leading guide is made. More specifically, the determination unit 27A acquires information representing the distance from the current position of the vehicle to the next guide point from the route guide unit 25 and determines whether the current position is within the area of the given distance from the guide point where the next leading guide made.

The area of the give distance, for example, may be a threshold area about the guide point with a radius of 100 meters.

When the determination unit 27A determines that the current position of the vehicle is out of the area of the given distance from the guide point where the next leading guide is made, the display controller 33A makes a display in the first mode on the display screen. In other words, when it is determined that the next guide point is out of the area of the given distance, the display controller 33A makes a display in the first mode.

When the determination unit 27A determines that the current position of the vehicle is within the area of the given distance from the guide point where the next leading guide is made, the display controller 33A switches the display screen from the first mode to the second mode. In other words, when it is determined that the next guide point is within the area of the given distance, the display controller 33A switches the display screen from the first mode to the second mode.

When the determination unit 27A determines that the current position of the vehicle is within the area of the given distance from the guide point where the next leading guide is made, the line-of-sight operation receiver 35A is unable to receive an operation performed using a line of sight. When the determination unit 27A determines that the current position of the vehicle is out of the area of the given distance from the guide point where the next leading guide is made, the line-of-sight operation receiver 35A is able to receive an operation performed using a line of sight.

Reception of an operation performed using a line of sight is enabled only in the first mode because it is required to pay attentions to driving particularly when the next guide point is within the area of the given distance. For this reason, when the next guide point is out of the area of the given distance, that is, when the driver has leeway, reception of an operation performed using a line of sight is enabled, that is, when the driver has leeway, reception of an operation performed using a line of sight is enabled.

Process in Display Control Device

Using FIG. 8, an example of a process in the control device 20A will be described. When music is reproduced and a route guide is made with the display device 1A being started, the process of the flowchart illustrated in FIG. 8 is executed. The same process as step S101, steps S105 to S109 in the flowchart illustrated in FIG. 6 is performed as the process of step S111 and steps S113 to S117.

The control device 20A determines whether the current position of the vehicle is out of the area of the given distance from the next guide point (step S112). More specifically, using the determination unit 27A, the control device 20A determines whether the current position of the vehicle is out of the area of the given distance from the next guide point. When it is determined that the current position of the vehicle is out of the area of the given distance from the next guide point (YES at step S112), the control device 20A moves to step S113. When it is determined that the current position of the vehicle is within the area of the given distance from the next guide point (NO at step S112), the control device 20A moves to step S116.

Effects

As described above, in the second embodiment, based on the result of determining whether the current position of the vehicle is within the area of the given distance from the next guide point where the next leading guide is made, the display screen is changed to the first mode in which the music information on the music that is being reproduced or the second mode in which the route guide image is displayed. In the second embodiment, it is possible to receive the operation of saving the information on the music being reproduced, which is an operation performed using a line of sight. According to the second embodiment, it is possible to save the information on the music being reproduced in the vehicle at appropriate timing while the vehicle is traveling.

In the second embodiment, it is possible to enable the operation of saving the information on the music being reproduced while the current position of the vehicle is being out of the area of the given distance from the guide point where the next leading guide is made and the first mode is being displayed on the display screen. In the second embodiment, it is possible to disable the operation of saving the information on the music being reproduced when the current position of the vehicle is within the area of the given distance from the guide point where the next leading guide is made and when attentions are required particularly to operations of driving the vehicle. According to the second embodiment, it is possible to save the information on the music being reproduce in the vehicle at more appropriate timing while the vehicle is traveling.

The display device according to the disclosure has been described and the display device may be carried out in a variety of different modes other than the above-described embodiments.

Each component of the display device illustrated in the drawings is a functional idea and need not necessarily be configured physically as illustrated in the drawings. In other words, specific modes of each device are not limited to those illustrated in the drawings and all or part of the device may be functionally or physically distributed or integrated in any unit according to the load and usage of each device.

The configuration of the display device 1 is realized as software using a program that is loaded in a memory, or the like. In the above-described embodiments, the configuration has been described as functional blocks that are realized by alignment of hardware or software. In other words, these functional blocks can be realized in a variety of forms using only hardware, only software, or a combination of hardware and software.

According to the disclosure, it is possible to save information on music that is being reproduced in a vehicle at appropriate timing while the vehicle is traveling.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display control device comprising:
   a positional information acquisition unit that acquires positional information representing a current position of a vehicle;
   a speed information acquisition unit that acquires speed information representing a speed of the vehicle;
   a calculator that, based on the positional information that is acquired by the positional information acquisition unit and the speed information that is acquired by the speed information acquisition unit, calculates a time required to travel from the current position of the vehicle to a guide point where the next leading guide is made on a route to a destination that the vehicle travels;
   a determination unit that determines whether the required time that is calculated by the calculator is equal to or more than a threshold time;
   a display controller that changes a display mode of a display screen based on a result of the determining by the determination unit; and
   a line-of-sight operation receiver that receives an operation performed using a line of sight of a person on board on the display screen,
   wherein the display mode includes a first mode in which music information on music that is being reproduced in the vehicle is displayed and a second mode that is different from the first mode and in which information other than the music information is displayed,
   the line-of-sight operation receiver receives a saving operation of saving information on the music that is being reproduced using a line of sight in the first mode and causes a storage unit to store the saving information on the music that is being reproduced, and
   the display controller makes a switch from the second mode to the first mode after the guide point is passed, and
   the line-of-sight operation receiver saves the music being reproduced with a high priority when the line-of-sight operation receiver receives the saving operation within a threshold operation time after the switch from the second mode to the first mode is made.

2. The display control device according to claim 1, wherein the display controller makes a switch from the first mode to the second mode when the determination unit determines that the required time is less the threshold time, and the line-of-sight operation receiver is unable to receive the saving operation when the determination unit determines that the required time is less than the threshold time.

3. The display control device according to claim 1, wherein the information on the music being reproduced contains at least any one of information on a date at a time when the saving operation is received and information on a position of the vehicle at the time when the saving operation is received.

4. A display control device comprising:

a positional information acquisition unit that acquires positional information representing a current position of a vehicle;

a route guide unit that acquires information on a guide point where the next leading guide is made from the current position of the vehicle on a route to a destination that the vehicle travels;

a determination unit that determines whether the current position of the vehicle is within an area of a given distance from the guide point;

a display controller that changes a display mode of a display screen based on a result of the determining by the determination unit; and a line-of-sight receiver that receives an operation performed using a line of sight of a person on the display screen, wherein the display mode includes a first mode in which music information on music that is being reproduced in the vehicle is displayed and a second mode that is different from the first mode and in which information other than the music information is displayed, the line-of-sight operation receiver receives a saving operation of saving information on the music being reproduced using a line of sight in the first mode and causes a storage unit to store the saving information on the music that is being reproduced, and the display controller makes a switch from the second mode to the first mode after the guide point is passed, and the line-of-sight operation receiver saves the music being reproduced with a high priority when the line-of-sight operation receiver receives the saving operation within a threshold operation time after the switch from the second mode to the first mode is made.

5. The display control device according to claim 4, wherein the display controller makes a switch from the first mode to the second mode when the determination unit determines that the current position of the vehicle is within the area of the given distance from the guide point, the line-of-sight operation receiver is unable to receive the saving operation when the determination unit determines that the current position of the vehicle is within the area of the given distance from the guide point.

6. The display control device according to claim 4, wherein the information on the music being reproduced contains at least any one of information on a date at a time when the saving operation is received and information on a position of the vehicle at the time when the saving operation is received.

7. A display control method executed by a computer that operates as a display control device, the method comprising:

acquiring positional information representing a current position of a vehicle;

acquiring speed information representing a speed of the vehicle;

based on the positional information that is acquired by the acquiring the positional information and the speed information that is acquired by the acquiring the speed information, calculating a time required to travel from the current position of the vehicle to a guide point where the next leading guide is made on a route to a destination that the vehicle travels;

determining whether the required time that is calculated by the calculating is equal to or more than a threshold time;

changing a display mode of a display screen based on a result of the determining; and receiving an operation performed using a line of sight of a person on board on the display screen, wherein the display mode includes a first mode in which music information on music that is being reproduced in the vehicle is displayed and a second mode that is different from the first mode and in which information other than the music information is displayed, the receiving includes receiving a saving operation of saving information on the music that is being reproduced using a line of sight in the first mode and causing a storage unit to store the saving information on the music that is being reproduced, and the changing makes a switch from the second mode to the first mode after the guide point is passed, and the receiving saves the music being reproduced with a high priority when the line-of-sight operation receiver receives the saving operation within a threshold operation time after the switch from the second mode to the first mode is made.

* * * * *